United States Patent
Yano (10) Patent No.: US 12,407,014 B2
(45) Date of Patent: Sep. 2, 2025

(54) ALL-SOLID-STATE BATTERY

(71) Applicant: TDK CORPORATION, Tokyo (JP)

(72) Inventor: Tomohiro Yano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 717 days.

(21) Appl. No.: 17/293,071

(22) PCT Filed: Nov. 28, 2019

(86) PCT No.: PCT/JP2019/046594
§ 371 (c)(1),
(2) Date: May 12, 2021

(87) PCT Pub. No.: WO2020/111185
PCT Pub. Date: Jun. 4, 2020

(65) Prior Publication Data
US 2021/0399339 A1  Dec. 23, 2021

(30) Foreign Application Priority Data
Nov. 30, 2018 (JP) .............................. 2018-225307

(51) Int. Cl.
*H01M 10/0562* (2010.01)
*H01M 4/02* (2006.01)
(Continued)

(52) U.S. Cl.
CPC ..... *H01M 10/0562* (2013.01); *H01M 4/0404* (2013.01); *H01M 4/134* (2013.01);
(Continued)

(58) Field of Classification Search
CPC ......... H01M 10/0525; H01M 10/0562; H01M 10/0585; H01M 4/0404; H01M 4/134;
(Continued)

(56) References Cited

U.S. PATENT DOCUMENTS

2009/0229114 A1  9/2009 Kimura
2012/0121965 A1  5/2012 Makino et al.
(Continued)

FOREIGN PATENT DOCUMENTS

CN    102468471 A    5/2012
DE  112007002406 T5  8/2009
(Continued)

OTHER PUBLICATIONS

Feb. 10, 2020 International Search Report issued in International Patent Application No. PCT/JP2019/046594.

*Primary Examiner* — Matthew T Martin
*Assistant Examiner* — Ankith R Sripathi
(74) *Attorney, Agent, or Firm* — Oliff PLC (57) ABSTRACT

An all-solid-state battery with which the occurrence of faults due to plating solution penetration can be further reduced and a non-defective item rate can be improved. An all-solid-state battery includes a laminated body in which electrode layers in which a current collector layer and active material layers are laminated with solid electrolyte layers containing a solid electrolyte there between. The electrode layer includes the current collector layer and the active material layers including an active material layer. The current collector layer includes a main body part formed inside the laminated body and an extension part that extends from an end surface from the main body part to an end surface of the laminated body. Then, the thickness ($T_e$) of the extension part on the end surface of the laminated body is smaller than the thickness ($T_b$) of the main body part.

11 Claims, 5 Drawing Sheets

(51) Int. Cl.
*H01M 4/04* (2006.01)
*H01M 4/134* (2010.01)
*H01M 4/505* (2010.01)
*H01M 4/525* (2010.01)
*H01M 10/0525* (2010.01)
*H01M 10/0585* (2010.01)

(52) U.S. Cl.
CPC ........... *H01M 4/505* (2013.01); *H01M 4/525* (2013.01); *H01M 10/0525* (2013.01); *H01M 10/0585* (2013.01); *H01M 2004/027* (2013.01); *H01M 2004/028* (2013.01); *H01M 2300/0068* (2013.01)

(58) Field of Classification Search
CPC ........ H01M 4/505; H01M 4/525; H01M 4/70; H01M 2004/0027; H01M 2004/028; H01M 2300/0068
See application file for complete search history.

(56) References Cited

U.S. PATENT DOCUMENTS

| 2018/0198170 | A1* | 7/2018 | Fujita | H01M 4/661 |
| 2019/0067665 | A1* | 2/2019 | Jang | H01M 50/176 |
| 2020/0194833 | A1* | 6/2020 | Kaye | H01M 4/50 |

FOREIGN PATENT DOCUMENTS

| JP | H05-326317 A | 12/1993 |
| JP | 2011-150974 A | 8/2011 |

* cited by examiner

ALL-SOLID-STATE BATTERY

TECHNICAL FIELD

The present disclosure relates to an all-solid-state battery, for example, an all-solid-state lithium-ion secondary battery.

Priority is claimed on Japanese Patent Application No. 2018-225307, filed Nov. 30, 2018, the content of which is incorporated herein by reference.

BACKGROUND ART

Lithium ion secondary batteries are widely used as power sources for small portable devices, for example, mobile phones, laptop PCs, and PDAs. There is a demand for the lithium ion secondary batteries used for such small portable devices to be made smaller, thinner, and more reliable.

As lithium ion secondary batteries, those using an organic electrolytic solution as an electrolyte and those using a solid electrolyte as an electrolyte are known. Compared to a lithium ion secondary battery using an organic electrolytic solution as an electrolyte, an all-solid-state lithium-ion secondary battery using a solid electrolyte as an electrolyte has advantages that it has a higher degree of freedom in design of the battery shape, the size and thickness of the battery are easily reduced, and the reliability is high because the leakage of electrolytic solution never occurs.

In addition, since an all-solid-state lithium-ion secondary battery is nonflammable like other electronic components, it has an advantage that it can be mounted on a board by reflow soldering.

Here, like in a laminated ceramic capacitor, with reflow soldering, when an outer electrode is formed in a multi-layer structure by utilizing copper paste application, baking, and an electroplating process, in the electroplating process, a problem of that a plating solution may enter the inside of the laminated body of the battery and cause faults occurs. In order to prevent such a problem of plating solution penetration, a so-called aperture pattern design in which the width of the end surface on the extraction electrode is narrowed is known (Patent Literature 1).

CITATION LIST

Patent Literature

[Patent Literature 1]
  Japanese Unexamined Patent Application, First Publication No. H5-326317

SUMMARY OF DISCLOSURE

Technical Problem

However, generally, in a process of producing an all-solid-state battery, because a baking temperature of a copper paste is lower than in a capacitor in order to prevent volatilization of lithium and voids are likely to occur in the copper layer, even if a so-called aperture pattern is used for electrodes, there is still a problem that many faults occur due to plating solution penetration.

The present disclosure has been made in view of the above circumstances, and an object of the present disclosure is to provide an all-solid-state battery with which the occurrence of faults due to plating solution penetration can be further reduced and a non-defective item rate can be improved.

Solution to Problem

In order to achieve the above object, the present disclosure provides the following aspects.

In order to achieve the above object, the present disclosure provides the following aspects.

[1] An all-solid-state battery including a laminated body in which electrode layers in which a current collector layer and active material layers are laminated are laminated with solid electrolyte layers containing a solid electrolyte therebetween,
  wherein the current collector layer includes a main body part formed inside the laminated body and an extension part that extends from an end surface of the main body part to an end surface of the laminated body, and
  wherein the thickness of the extension part on the end surface of the laminated body is smaller than the thickness of the main body part.

[2] The all-solid-state battery according to [1], wherein the ratio of the thickness of the extension part to the thickness of the main body part is 20% or more and 50% or less.

[3] The all-solid-state battery according to [2], wherein the thickness of the extension part is 0.3 µm or more and 3 µm or less.

[4] The all-solid-state battery according to any one of [1] to [3], wherein the ratio of the length of the extension part in the extension direction to the length of the main body part is 0.2% or more and 20% or less.

[5] The all-solid-state battery according to [4], wherein the length of the extension part in the extension direction is 10 µm or more and 1,000 µm or less.

[6] The all-solid-state battery according to any one of [1] to [5],
  wherein the laminated body has a plurality of electrode layers, and a first electrode layer positioned at one end of the laminated body in the lamination direction includes a first current collector layer and a first active material layer,
  wherein the first current collector layer includes a first main body part formed inside the laminated body and a first extension part that extends from an end surface of the first main body part to an end surface of the laminated body, and
  wherein the first extension part is provided to be shifted from the center position of the first main body part in the thickness direction toward the central part of the laminated body with respect to the lamination direction of the laminated body.

[7] The all-solid-state battery according to [6],
  wherein a second electrode layer positioned at the other end of the laminated body in the lamination direction includes a second current collector layer and a second active material layer,
  wherein the second current collector layer includes a second main body part formed inside the laminated body and a second extension part that extends from an end surface of the second main body part to an end surface of the laminated body, and
  wherein the second extension part is provided to be shifted from the center position of the second main body part in the thickness direction toward the central part of the laminated body with respect to the lamination direction of the laminated body.

[8] The all-solid-state battery according to [7], wherein one of the first electrode layer and the second electrode layer constitutes a positive electrode, and the other of the first electrode layer and the second electrode layer constitutes a negative electrode.

[9] The all-solid-state battery according to [7], wherein both of the first electrode layer and the second electrode layer constitute either a positive electrode or a negative electrode.

Advantageous Effects of Disclosure

According to the present disclosure, it is possible to further reduce the occurrence of faults due to plating solution penetration and improve a non-defective item rate.

DESCRIPTION OF EMBODIMENTS

Hereinafter, embodiments of the present disclosure will be described in detail with reference to the drawings.
[Configuration of All-Solid-State Battery]

FIG. 1(a) is a lateral view of an all-solid-state battery according to the present embodiment and FIG. 1(b) is a partially enlarged cross-sectional view of FIG. 1(a).

As shown in FIG. 1(a) and FIG. 1(b), an all-solid-state battery 1 includes a laminated body 2 in which electrode layers 10 (electrode layers 10a and 10b) in which a current collector layer 11 (current collector layers 11a and 11b) and active material layers 12 (active material layers 12a and 12b) are laminated are laminated with solid electrolyte layers 20 containing a solid electrolyte therebetween. The all-solid-state battery 1 is not particularly limited, but may be an all-solid-state secondary battery and may be an all-solid-state lithium-ion secondary battery.

The all-solid-state battery 1 includes the electrode layers 10 composed of an electrode layer group 10A and an electrode layer group 10B, the electrode layer group 10A including the electrode layers 10a, 10a, . . . , and the electrode layer group 10B including a plurality of electrode layers 10b, 10b, . . . . One of the electrode layer 10a and the electrode layer 10b constitutes a positive electrode, and the other thereof constitutes a negative electrode. The polarity of each electrode layer can be changed depending on which polarity is connected to an external terminal to be described below. For example, the electrode layer 10a functions as a positive electrode, and the electrode layer 10b functions as a negative electrode.

The electrode layers 10a are connected to an outer electrode 3, and the electrode layers 10b are connected to an outer electrode 4. The outer electrode 3 and the outer electrode 4 form an electrical contact with the outside.

In the laminated body 2, the electrode layers 10a and the electrode layers 10b are alternately laminated with the solid electrolyte layers 20 therebetween. The all-solid-state battery 1 is charged and discharged by transfer of lithium ions between the electrode layers 10a and the electrode layers 10b via a solid electrolyte.

(Electrode Layer)

The electrode layer 10a includes the current collector layer 11a and the active material layers 12a and 12a including an active material layer. In addition, the electrode layer 10b includes the current collector layer 11b and the active material layers 12b and 12b including an active material layer.

As shown in FIG. 1(b), the current collector layer 11a includes, for example, a main body part 11a-1 provided inside the laminated body 2 and an extension part 11a-2 that extends from an end surface 13a of the main body part 11a-1 to an end surface 2a of the laminated body 2. Further, the thickness $T_e$ of the extension part 11a-2 on the end surface 2a of the laminated body 2 is smaller than the thickness $T_b$ of the main body part 11a-1 ($t_e < t_b$). In this case, when the outer electrode 3 is formed, although a certain amount of the plating solution penetrates into voids in a metal layer (for example, a copper layer) constituting the outer electrode 3, the plating solution is unlikely to reach the extension part 11a-2 since the area of the extension part 11a-2 on the end surface 13a of the extension part 11a-2 is small. Therefore, it is possible to prevent the plating solution from penetrating into the inside of the laminated body 2 through the interface between the extension part 11a-2 and the solid electrolyte layer 20.

The ratio of the thickness to of the extension part 11a-2 to the thickness to of the main body part 11a-1 may be 20% or more and 50% or less. When the ratio ($t_e/t_b$) is less than 20%, the electrical resistance between the extension part 11a-2 and the outer electrode 3 is high and the battery capacity is low. In addition, when the ratio exceeds 50%, minimizing penetration of the plating solution sufficiently is difficult. Therefore, the ratio of the thickness $t_e$ of the extension part 11a-2 to the thickness $t_b$ of the main body part 11a-1 is set to a value within the above range.

The thickness $t_b$ of the main body part 11a-1 is not particularly limited, and is, for example, 0.6 μm or more and 15 μm or less. In addition, the thickness $t_e$ of the extension part 11a-2 is not particularly limited, and is, for example, 0.3 μm or more and 3 μm or less.

In addition, the ratio of the length of the extension part 11a-2 in the extension direction to the length of the main body part 11a-1 can be, for example, 0.2% or more and 20% or less. In addition, the length of the extension part 11a-2 in the extension direction is not particularly limited, and is, for example, 10 μm or more and 1,000 μm or less. When the length of the extension part 11a-2 in the extension direction is less than 10 μm, it is difficult to sufficiently minimize penetration of the plating solution, and when the length exceeds 1,000 μm, the electrical resistance in the extension part 11a-2 is high, the battery capacity is low, and an effect of minimizing penetration of the plating solution is not improved as compared with the length of 1,000 μm.

Figure 2:
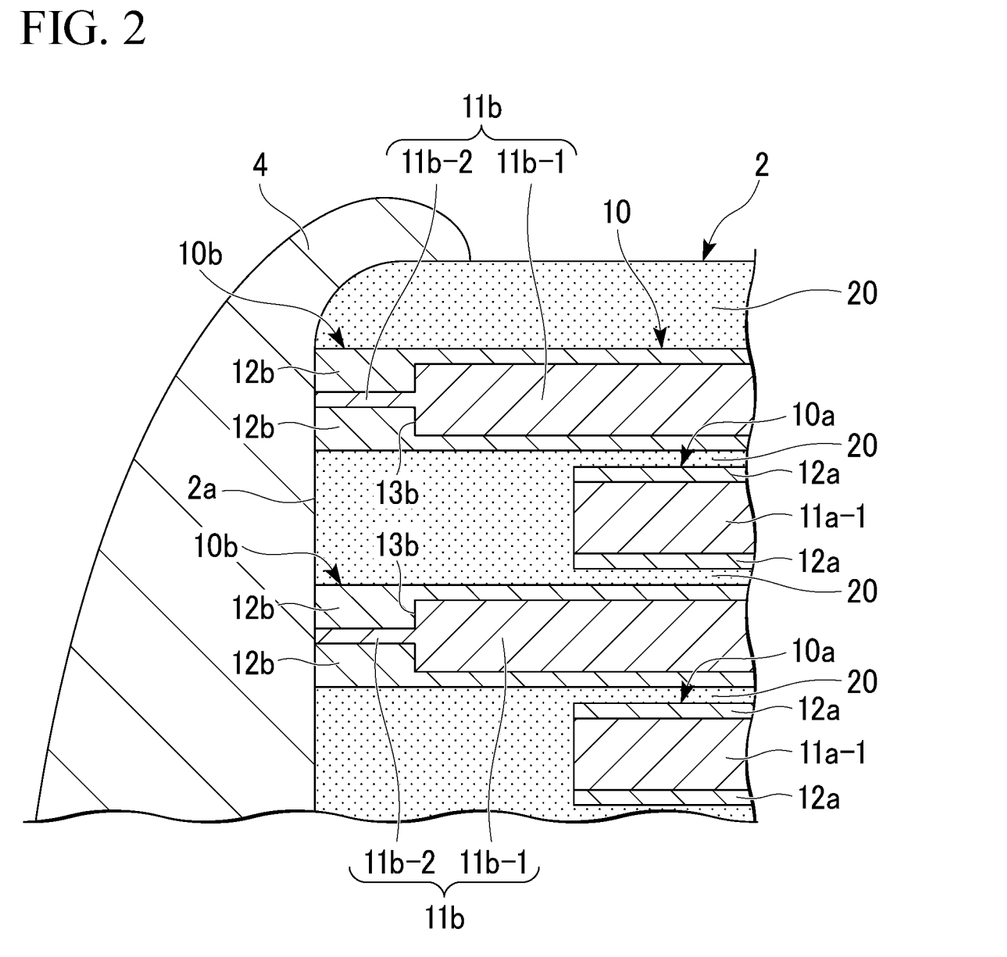
FIG. 2 is a partially enlarged cross-sectional view at a position B in FIG. 1(a).

In addition, as shown in FIG. 2, like the current collector layer 11a, the current collector layer 11b may include a main body part 11b-1 formed inside the laminated body 2 and an extension part 11b-2 that extends from an end surface 13b of the main body part 11b-1 to the end surface 2a of the laminated body 2. In this case, it is preferable that the thickness of the extension part 11b-2 on the end surface 2a of the laminated body 2 be smaller than the thickness of the main body part 11b-1. In addition, the ratio of the thickness of the extension part 11b-2 to the thickness of the main body part 11b-1 is preferably 20% or more and 50% or less.

In addition, in the current collector layer 11b, the ratio of the length of the extension part 11b-2 in the extension direction to the length of the main body part 11b-1 can be 0.2% or more and 20% or less like the current collector layer 11a. In addition, like the current collector layer 11a, the length of the extension part 11b-2 in the extension direction can be, for example, 10 μm or more and 1,000 μm or less.

The current collector layer 11a and the current collector layer 11b may have high conductivity. Therefore, for the current collector layer 11a and the current collector layer 11b, silver, palladium, gold, platinum, aluminum, copper, nickel, or the like may be used. Among these substances, copper is less likely to react with a positive electrode active material, a negative electrode active material, and a solid electrolyte. Therefore, when copper is used for the current collector layer 11a and the current collector layer 11b, it is possible to reduce the internal resistance of the all-solid-state battery 1. Here, substances constituting the current collector layer 11a and the current collector layer 11b may be the same as or different from each other.

The active material layer 12a is formed on both surfaces of the current collector layer 11a. However, for example, between the electrode layer 10a and the electrode layer 10b, when the electrode layer 10a is formed as the bottom layer of the laminated body 2 in the lamination direction, there is no facing electrode layer 10b under the electrode layer 10a positioned as the bottom layer. Therefore, in the electrode layer 10a positioned as the bottom layer, the active material layer 12a may be formed on only one surface on the upper side in the lamination direction.

Like the active material layer 12a, the active material layer 12b is formed on both surfaces of the current collector layer 11b. However, between the electrode layer 10a and the electrode layer 10b, when the electrode layer 10b is formed as the top layer of the laminated body 2 in the lamination direction, in the electrode layer 10b positioned as the top layer, the active material layer 12b may be formed on only one surface on the lower side in the lamination direction.

The active material layer 12a contains one of a positive electrode active material and a negative electrode active material that transfer electrons, and the active material layer 12b contains the other of the positive electrode active material and the negative electrode active material. The positive electrode active material and the negative electrode active material may allow efficient insertion and extraction of lithium ions. In addition, the active material layer 12a and the active material layer 12b may contain a conductivity agent, a conducting ion agent, a binding agent, and the like in addition to the above positive electrode active material and negative electrode active material.

For the positive electrode active material and the negative electrode active material, for example, a transition metal oxide or a transition metal composite oxide may be used. Specifically, lithium manganese composite oxide $Li_2Mn_aMa_{1-a}O_3$ (0.8≤a≤1, Ma=Co, Ni), lithium cobalt oxide ($LiCoO_2$), lithium nickelate ($LiNiO_2$), lithium manganese spinel ($LiMn_2O_4$), a composite metal oxide represented by a general formula: $LiNi_xCo_yMn_zO_2$ (x+y+z=1, 0≤x≤1, 0≤y≤1, 0≤z≤1), a lithium vanadium compound ($LiV_2O_5$), olivine-type $LiMbPO_4$ (where, Mb is at least one element selected from among Co, Ni, Mn, Fe, Mg, Nb, Ti, Al, and Zr), lithium vanadium phosphate ($Li_3V_2(PO_4)_3$ or $LiVOPO_4$), a Li-excess solid solution represented by $Li_2MnO_3$-$LiMcO_2$ (Mc=Mn, Co, Ni), lithium titanate ($Li_4Ti_5O_{12}$), a composite metal oxide represented by $Li_sNi_tCo_uAl_vO_2$ (0.9<s<1.3, 0.9<t+u+v<1.1), and the like can be used.

The negative electrode active material and the positive electrode active material may be selected according to a solid electrolyte to be described below.

For example, when $Li_{1+n}Al_nTi_{2-n}(PO_4)_3$ (0≤n≤0.6) is used as a solid electrolyte, it is preferable to use one or both of $LiVOPO_4$ and $Li_3V_2(PO_4)_3$ as the positive electrode active material and the negative electrode active material. In this case, the bonding at the interface between the active material layer 12a and the active material layer 12b, and the solid electrolyte layer 20 becomes strong. In addition, the contact area at the interface between the active material layer 12a and the active material layer 12b, and the solid electrolyte layer 20 can be enlarged.

There is no clear distinction between active materials constituting the active material layer 12a and the active material layer 12b. Comparing potentials of two compounds, a compound exhibiting a higher potential can be used as the positive electrode active material, and a compound exhibiting a lower potential can be used as the negative electrode active material.

In addition, as the negative electrode active material and the positive electrode active material, for example, an active material in which some of V in $Li_3V_2(PO_4)_3$ is replaced with another element M can be used. Specifically, as the negative electrode active material and the positive electrode active material, an active material represented by a chemical formula $Li_3V_{2-x}M_x(PO_4)_3$ (0<x≤1.4) and in which M is an element that becomes a divalent or tetravalent cation in a crystal structure may be used.

Such an active material can achieve higher electron conductivity than an active material $Li_3V_2(PO_4)_3$ in which there is no replacement with an element. When there is replacement with an element that can become a divalent cation, oxygen deficiency is more likely to occur in the crystal lattice, and free electrons are generated due to the occurrence of oxygen deficiency. In addition, when there is replacement with an element that can become a tetravalent cation, holes are likely to be formed in the crystal lattice and holes are generated. In this manner, when some of V is replaced with a divalent or tetravalent element in the crystal lattice, the electron conductivity of the active material can be improved and the internal resistance of the all-solid-state secondary battery can be reduced.

For convenience, the active material is described as used for an all-solid-state secondary battery, but the present disclosure is not limited thereto, and the active material may be used for other batteries such as a primary battery and a fuel cell.

In the chemical formula $Li_3V_{2-x}M_xPO_4)_3$, an element represented by M may be an element that becomes a divalent or tetravalent cation in the crystal structure. In the chemical formula $Li_1V_{2-x}M_x(PO_4)_3$, an element represented by M may be at least one element selected from the group consisting of Mg, Ca, Ti, Zr, Sr, Ba, Nb, Ta, Cr, Mn, Fe, Co, Ni, Cu, Zn, Mo, Ru, Rh and W. More preferably, in the chemical formula $Li_3V_{2-x}M_x(PO_4)_3$, an element represented by M may be at least one element selected from the group consisting of Mg, Ca, Ti and Zr. Most preferably, in the chemical formula $Li_3V_{2-x}M_x(PO_4)_3$, an element represented by M may be Ti.

For example, Ti has an ionic radius close to an ionic radius of a (hexacoordinate) trivalent V cation. It is thought that an element having an ionic radius close to an ionic radius of a (hexacoordinate) trivalent V cation easily replaces V. An element having an ionic radius larger than an ionic radius of a (hexacoordinate) trivalent V cation tends to weaken the bond between the element and O in the $Li_3V_2(PO_4)_3$ crystal when V is replaced with the element. Therefore, oxygen is easily desorbed by a heat treatment in a reducing atmosphere or the like.

Examples of conductivity agents include carbon materials such as carbon black, acetylene black, ketjen black, carbon nanotubes, graphite, graphene, and activated carbon, and metal materials such as gold, silver, palladium, platinum, copper, and tin.

Examples of conducting ion agents include a solid electrolyte. As the solid electrolyte, specifically, for example, the same material as the material used for a solid electrolyte layer 50 can be used.

When a solid electrolyte is used as a conducting ion agent, the same material may be used for the conducting ion agent and the solid electrolyte used for the solid electrolyte layer 50.

(Solid Electrolyte)

The solid electrolyte constituting the solid electrolyte layer 20 may be a phosphate-based solid electrolyte. As the solid electrolyte, it is preferable to use a material having low electron conductivity and high lithium ion conductivity.

Specifically, for example, at least one selected from the group consisting of perovskite type compounds such as $La_{0.5}Li_{0.5}TiO_3$, LISICON-type compounds such as $Li_{14}Zn(GeO_4)_4$, garnet type compounds such as $L_{17}La_3Zr_2O_{12}$, NASICON type compounds such as $Li_{1.3}Al_{0.3}Ti_{1.7}(PO_4)_3$ and $Li_{1.5}Al_{0.5}Ge_{1.5}(PO_4)_3$, thio-LISICON-type compounds such as $Li_{3.25}Ge_{0.25}P_{0.75}S_4$ and $Li_3PS_4$, glass compounds such as $Li_2S-P_2S_5$ and $Li_2O-V_2O_5-SiO_2$, and phosphoric acid compounds such as $Li_3PO_4$, $Li_{3.5}Si_{0.5}P_{0.5}O_4$ and $Li_{2.9}P_{3.3}N_{0.46}$ is desirable.

The solid electrolyte may be an oxide-based solid electrolyte containing an element represented by M in the chemical formula $Li_3V_{2-x}M_x(PO_4)_3$. Such a solid electrolyte is used in the all-solid-state secondary battery.

As the solid electrolyte of the present embodiment, a lithium ion conductor having a NASICON type crystal structure may be used, for example, a solid electrolyte material represented by $LiZr_2(PO_4)_3$, $Li_{1.3}Al_{0.3}Ti_{1.7}(PO_4)_3$, or $Li_{1.5}Al_{0.5}Ge_{1.5}(PO_4)_3$ may be included.

When $LiZr_2(PO_4)_3$ is used as a solid electrolyte, those replaced with Ca or Y may be used. For example, $Li_{1.4}Ca_{0.2}Zr_{1.8}(PO_4)_3$ for replacement with Ca and $Li_{1.15}Y_{0.15}Zr_{1.85}(PO_4)_3$ for replacement with Y may be exemplified.

When the solid electrolyte contains an element M, the change in the concentration of the element M at the bonding interface between the active material layer 12a and/or the active material layer 12b containing the element M becomes moderate. Therefore, the activation energy of Li ions at the bonding interface between the active material layer 12a and the solid electrolyte layer 20, and the bonding interface between the active material layer 12b and the solid electrolyte layer 20 shrinks. Here, the activation energy is the energy required for Li ions to pass through the bonding interface between the active material layer 12a and the solid electrolyte layer 20, and the bonding interface between the active material layer 12b and the solid electrolyte layer 20. Therefore, Li ions can easily move at the bonding interface between the active material layer 12b and the solid electrolyte layer 20 and the bonding interface between the active material layer 12b and the solid electrolyte layer, and Li ion conductivity at the bonding interface is improved. Therefore, the internal resistance of the all-solid-state secondary battery is reduced.

(Outer Electrode)

The outer electrodes 3 and 4 are formed in contact with the lateral surface (exposed surfaces of the end surfaces of the electrode layer 10a and the electrode layer 10b) of the laminated body 2. The outer electrodes 3 and 4 are connected to an external terminal (not shown), and transfer electrons to the laminated body 2.

In the outer electrodes 3 and 4, it is preferable to use a material having high conductivity. For example, silver, gold, platinum, aluminum, copper, tin, nickel, gallium, indium, and alloys thereof can be used. In addition, the outer electrodes 3 and 4 may be formed in a multi-layer structure, and can have, for example, a laminated structure in which a metal layer and a plating layer are laminated. In this case, the plating layer is formed over a part or all of the metal layer.

[Method of Producing All-Solid-State Battery]

Next, a method of producing an all-solid-state battery will be described. For convenience of explanation, a method of producing an all-solid-state battery including the laminated body 2 in which the electrode layer 10a functions as a positive electrode and the electrode layer 10b functions as a negative electrode will be described.

(Formation of Laminated Body)

As a method of forming the laminated body 2, a simultaneous firing method may be used or a sequential firing method may be used.

The simultaneous firing method is a method in which materials forming each layer are laminated, and then fired together to produce a laminated body. The sequential firing method is a method in which layers are produced in order, and is a method in which a firing process is performed whenever each layer is produced. When the simultaneous firing method is used, the laminated body 2 can be formed with a smaller number of operation processes than when the sequential firing method is used. In addition, when the simultaneous firing method is used, the laminated body 2 to be obtained becomes denser than when the sequential firing method is used. Hereinafter, a case in which the laminated body 2 is produced using the simultaneous firing method will be exemplified.

The simultaneous firing method includes a process of preparing a paste of materials constituting the laminated body 2, a process of applying and drying the paste to produce a green sheet, and a process of laminating green sheets to form a laminated sheet and simultaneously firing it.

First, materials of the current collector layer 11a, the active material layer 12a, the solid electrolyte layer 20, the active material layer 12b and the current collector layer 11b, which form the laminated body 2, are formed into a paste.

A method of forming materials into a paste is not particularly limited. For example, powders of materials are mixed with a vehicle to obtain a paste. Here, the vehicle is a general term for a medium in a liquid phase. The vehicle contains a solvent and a binder.

According to such a method, a paste for the current collector layer 11a, a paste for the active material layer 12a, a paste for the solid electrolyte layer 20, a paste for the active material layer 12b, and a paste for the current collector layer 11b are produced.

Next, a laminated sheet is prepared. The laminated sheet can be produced using, for example, the following method in which a positive electrode active material layer unit and a negative electrode active material layer unit are produced and laminated.

First, the paste for the solid electrolyte layer 20 is applied onto a substrate such as a PET film by a doctor blade method and dried to form the sheet-like solid electrolyte layer 20. Next, the paste for the active material layer 12a is printed on the solid electrolyte layer 20 by screen printing and dried to form the active material layer 12a.

Next, the paste for the current collector layer 11a is printed on the active material layer 12a by screen printing and dried to form the current collector layer 11a. In this case, screen printing is performed in multiple processes (three times in the configuration of FIG. 1(b)), and a first process in which the paste for the current collector layer 11a is not printed to the end surface, a second process in which a copper paste is printed to the end surface, and a third process in which a copper paste is not printed to the end surface are performed in this order. Thereby, the extension part 11a-2 is formed on the current collector layer 11a.

When the extension part 11a-2 is formed at one end (the same surface as one main surface) of the main body part 11a-1 in the thickness direction of the current collector layer 11a, the second process in which the paste for the current collector layer 11a is printed to the end surface and the third process in which a copper paste is not printed to the end surface can be performed without performing the first process.

In addition, the paste for the active material layer 12a is printed on the current collector layer 11a by screen printing and dried to form the active material layer 12a.

Then, the PET film is peeled off to obtain an active material layer unit as a positive electrode. The positive electrode active material layer unit is a laminated sheet in which the solid electrolyte layer 20/the active material layer 12a/the current collector layer 11a/the active material layer 12a are laminated in this order.

According to the same procedure, an active material layer unit as a negative electrode is produced. The active material layer unit is a laminated sheet in which the solid electrolyte layer 20/the active material layer 12b/the current collector layer 11b/the active material layer 12b are laminated in this order.

Next, one active material layer unit as a positive electrode and one negative electrode active material layer unit as a negative electrode are laminated.

In this case, the active material layer 12a of the active material layer unit as a positive electrode and the solid electrolyte layer 20 of the active material layer unit as a negative electrode are laminated so that they are in contact with each other, or the solid electrolyte layer 20 constituting the active material layer unit as a positive electrode and the active material layer 12b constituting the active material layer unit as a negative electrode are laminated so that they are in contact with each other. Thereby, a laminated sheet in which the active material layer 12a/the current collector layer 11a/the active material layer 12a/the solid electrolyte layer 20/the active material layer 12b/the current collector layer 11b/the active material layer 12b/the solid electrolyte layer 20 are laminated in this order is obtained.

In addition, when the active material layer unit as the positive electrode and the active material layer unit as the negative electrode are laminated, the units are shifted and laminated so that the extension part 11a-2 of the current collector layer 11a within the active material layer unit as the positive electrode extends only to one end surface, and the extension part of the current collector layer 11b within the active material layer unit as the negative electrode extends only to the other surface. Then, a sheet for a solid electrolyte 20 with a predetermined thickness is additionally laminated on the top layer and the bottom layer of the laminated body in which the active material layer units are laminated to prepare a laminated sheet.

Next, the produced laminated sheets are crimped together. The crimping is preferably performed while heating. The heating temperature during crimping is, for example, 40 to 95° C.

Next, the crimped laminated sheet (green sheet laminate) is heated under, for example, a nitrogen, hydrogen and water vapor atmosphere, at 500° C. to 750° C., to remove the binder. Then, under a nitrogen, hydrogen and water vapor atmosphere, heating and firing are performed at 600° C. to 1,000° C. to obtain a sintered product. The firing time is, for example, 0.1 to 3 hours.

The obtained sintered product (the laminated body 2) may be put into a cylindrical container together with a polishing material such as alumina and subjected to barrel polishing. Thereby, corners of the laminated body 2 can be chamfered. As another method, the laminated body 2 may be polished by sand blasting. This method is preferable because only a specific part can be cut. According to the above process, the laminated body 2 is obtained.

Then, when the outer electrodes 3 and 4 are formed at the end of the laminated body 2 produced in the above procedure, an all-solid-state lithium-ion secondary battery can be produced. The outer electrodes 3 and 4 are, for example, formed of a multi-layer structure obtained in a copper paste application process, a baking process and an electroplating process in this order. Thereby, the all-solid-state battery 1 including the laminated body 2 is produced.

As described above, according to the present embodiment, since the thickness $T_e$ of the extension part 11a-2 on the end surface of the laminated body 2 is smaller than the thickness $T_b$ of the main body part 11a-1, the plating solution is unlikely to penetrate when the outer electrode 4 is formed, and it is possible to further reduce the occurrence of faults due to plating solution penetration, and improve the non-defective item rate.

Figure 1:
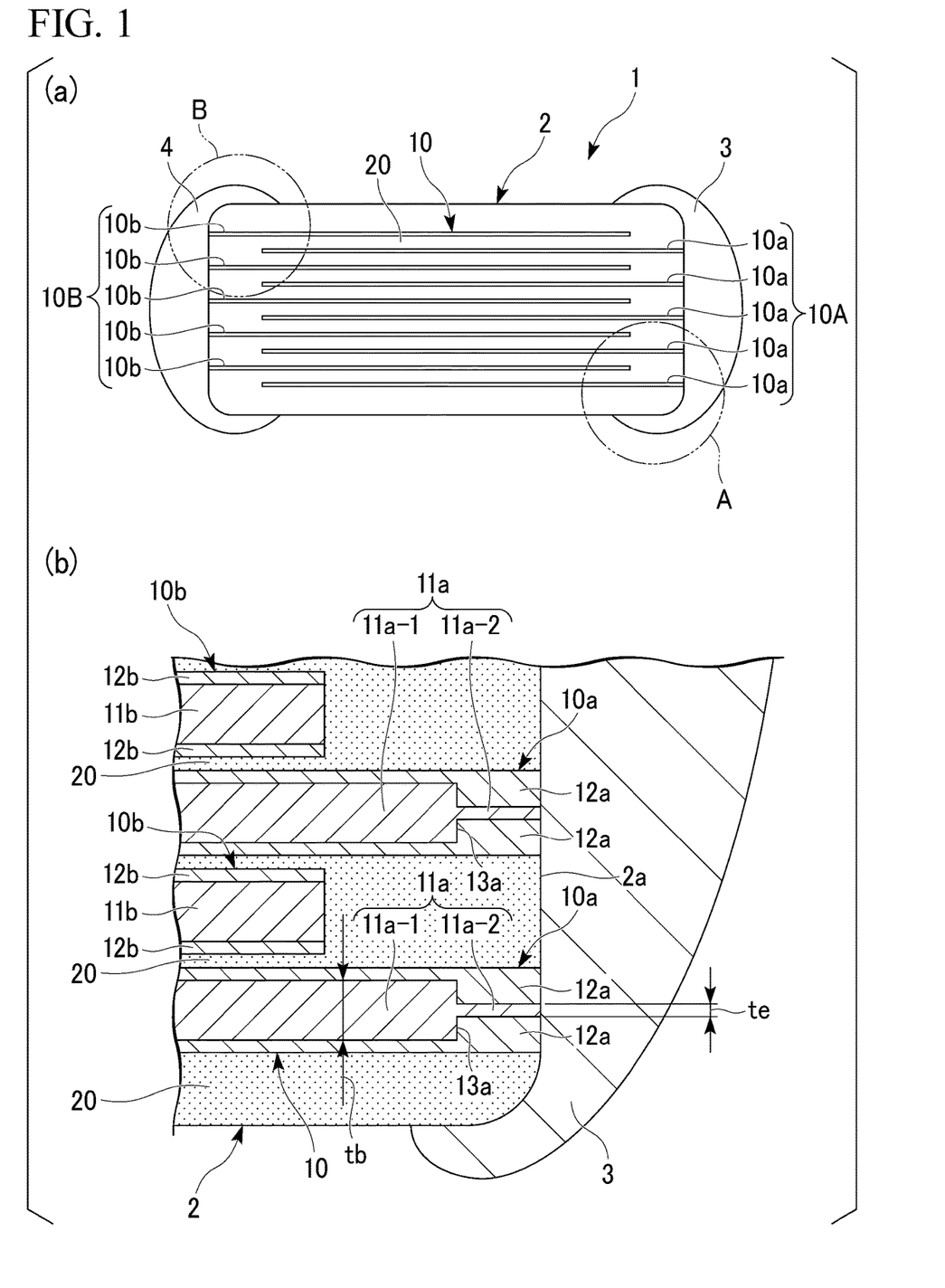
FIG. 1(a) is a lateral view of an all-solid-state battery according to the present embodiment and FIG. 1(b) is a partially enlarged cross-sectional view at a position A in FIG. 1(a).
Figure 3:
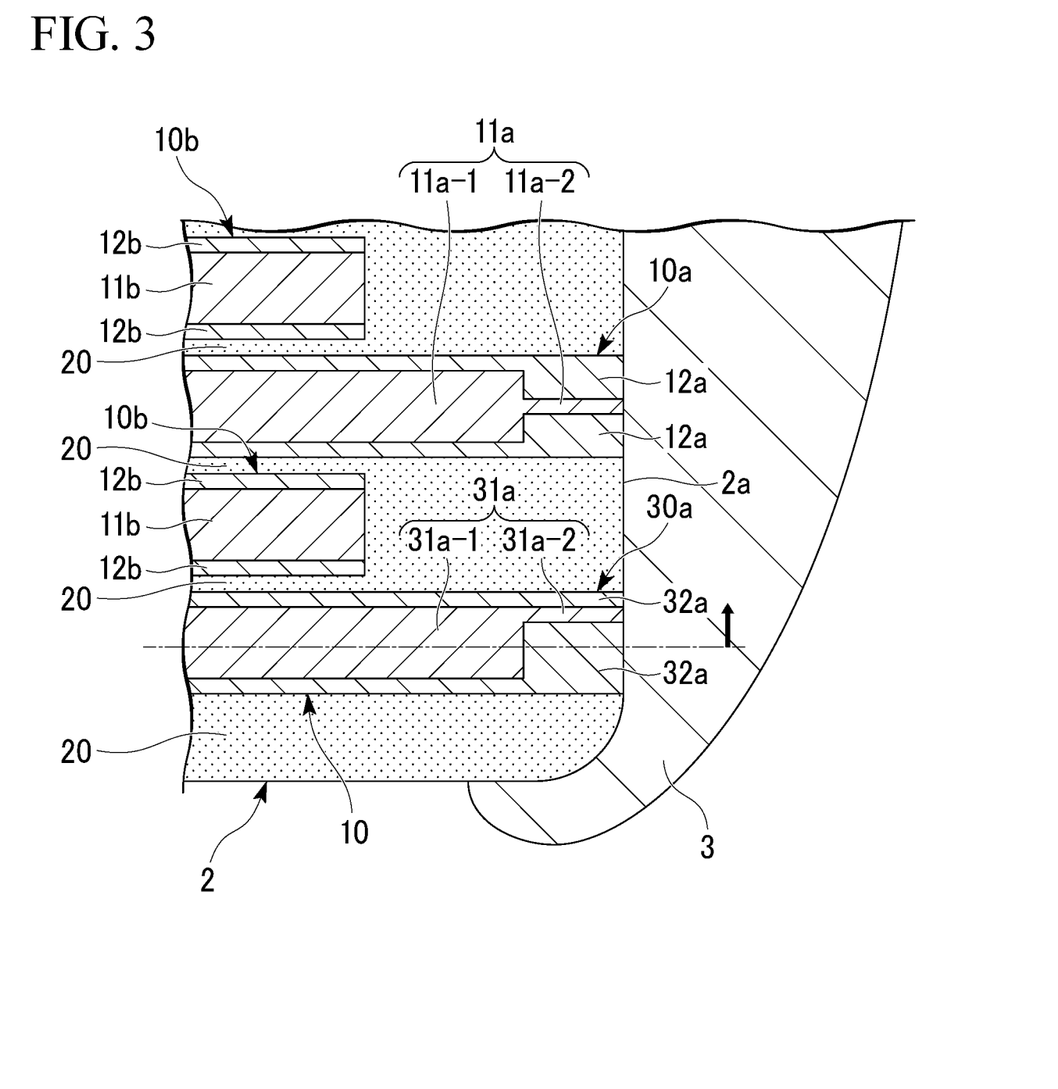
FIG. 3 is a partially enlarged cross-sectional view showing a modified example of a current collector layer on the side of a positive electrode in FIG. 1.

FIG. 3 is a diagram showing a modified example of the current collector layer 11a in FIG. 1.

In FIG. 3, the laminated body 2 has a plurality of electrode layers, and a first electrode layer 30a positioned at one end of the laminated body 2 in the lamination direction includes a first current collector layer 31a and a first active material layer 32a. Specifically, the first electrode layer 30a positioned at the lower end of the laminated body 2 in the lamination direction includes the first current collector layer 31a and the first active material layers 32a and 32a. In addition, the first current collector layer 31a includes a first main body part 31a-1 formed inside the laminated body 2 and a first extension part 31a-2 that extends from an end surface 33a of the first main body part 31a-1 to the end surface 2a of the laminated body 2.

In this configuration, with respect to the lamination direction of the laminated body 2, the first extension part 31a-2 be provided to be shifted from the center position of the first main body part 31a-1 in the thickness direction toward the central part of the laminated body 2. In the present embodiment, the first extension part 31a-2 is provided to be shifted from the center position of the first main body part 31a-1 in the thickness direction to the upper side (arrow side in the drawing). In addition, the first extension part 31a-2 may be provided at the upper end part of the first main body part 31a-1 in the thickness direction on the end surface 33a of the first main body part 31a-1. In the vicinity of a lower corner 2b of the laminated body 2, the metal layer (for example, a copper layer) constituting the outer electrode 3 is likely to be thinned and the plating solution is more likely to penetrate. Therefore, when the first extension part 31a-2 is provided to be shifted from the center position of the first main body part 31a-1 in the thickness direction toward the central part of the laminated body 2, the end surface of the first extension part 31a-2 can be positioned where the relatively thick metal layer is formed, and it is possible to further reduce plating solution penetration.

The first active material layer 32a is formed on both surfaces of the first current collector layer 31a, but the present disclosure is not limited thereto, and the first active material layer 32a may be formed only on one surface on the upper side of the laminated body 2 in the lamination direction.

Figure 4:
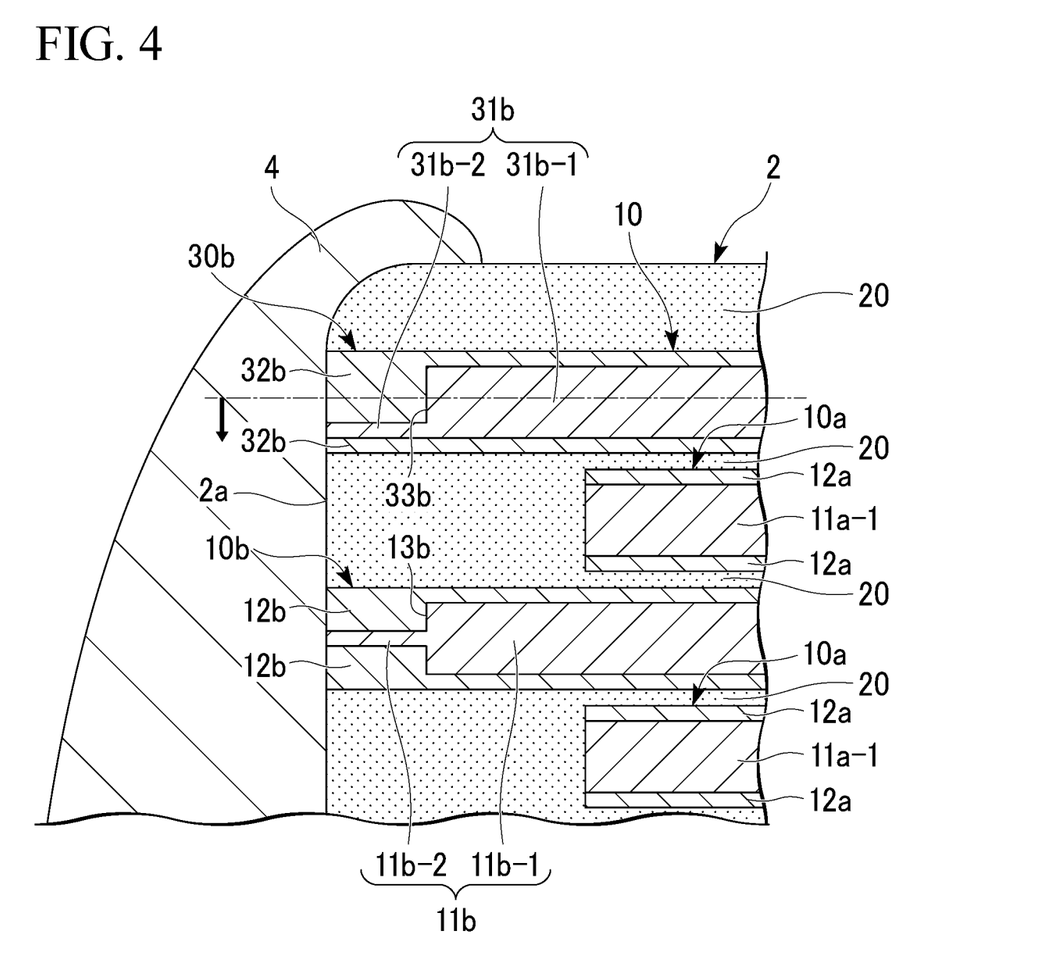
FIG. 4 is a partially enlarged cross-sectional view showing a modified example of the current collector layer on the side of a negative electrode in FIG. 1.

FIG. 4 is a diagram showing a modified example of the current collector layer 11b in FIG. 1.

In FIG. 4, the laminated body 2 has a plurality of electrode layers, and a second electrode layer 30b positioned at the other end of the laminated body 2 in the lamination direction includes a second current collector layer 31b and second active material layers 32b and 32b. Specifically, the second electrode layer 30b positioned at the upper end of the laminated body 2 in the lamination direction includes the second current collector layer 31b and the second active material layers 32b and 32b. Then, the second current collector layer 31b includes a second main body part 31b-1 formed inside the laminated body 2 and a second extension part 31b-2 that extends from an end surface 33b of the second main body part 31b-1 to the end surface 2a of the laminated body 2.

In this configuration, with respect to the lamination direction of the laminated body 2, the second extension part 31b-2 may be provided to be shifted from the center position of the second main body part 31b-1 in the thickness direction toward the central part of the laminated body 2. In the present embodiment, the second extension part 31b-2 is provided to be shifted from the center position of the second main body part 31b-1 in the thickness direction to the lower side (arrow side in the drawing). In addition, the second extension part 31b-2 may be provided at the lower end part of the second main body part 31b-1 in the thickness direction on the end surface 33b of the second main body part 31b-1. In the vicinity of an upper corner 2c of the laminated body 2, as in the vicinity of the lower corner 2b, the metal layer constituting the outer electrode 4 is likely to be thinned and the plating solution is more likely to penetrate. Therefore, when the second extension part 31b-2 is provided to be shifted from the center position of the second main body part 31b-1 in the thickness direction toward the central part of the laminated body 2, the end surface of the second extension part 31b-2 can be positioned where the relatively thick metal layer is formed, and it is possible to further reduce plating solution penetration.

The second active material layer 32b is formed on both surfaces of the second current collector layer 31b, but the present disclosure is not limited thereto, and the second active material layer 32b may be formed only on one surface on the lower side of the laminated body 2 in the lamination direction.

Figure 5:
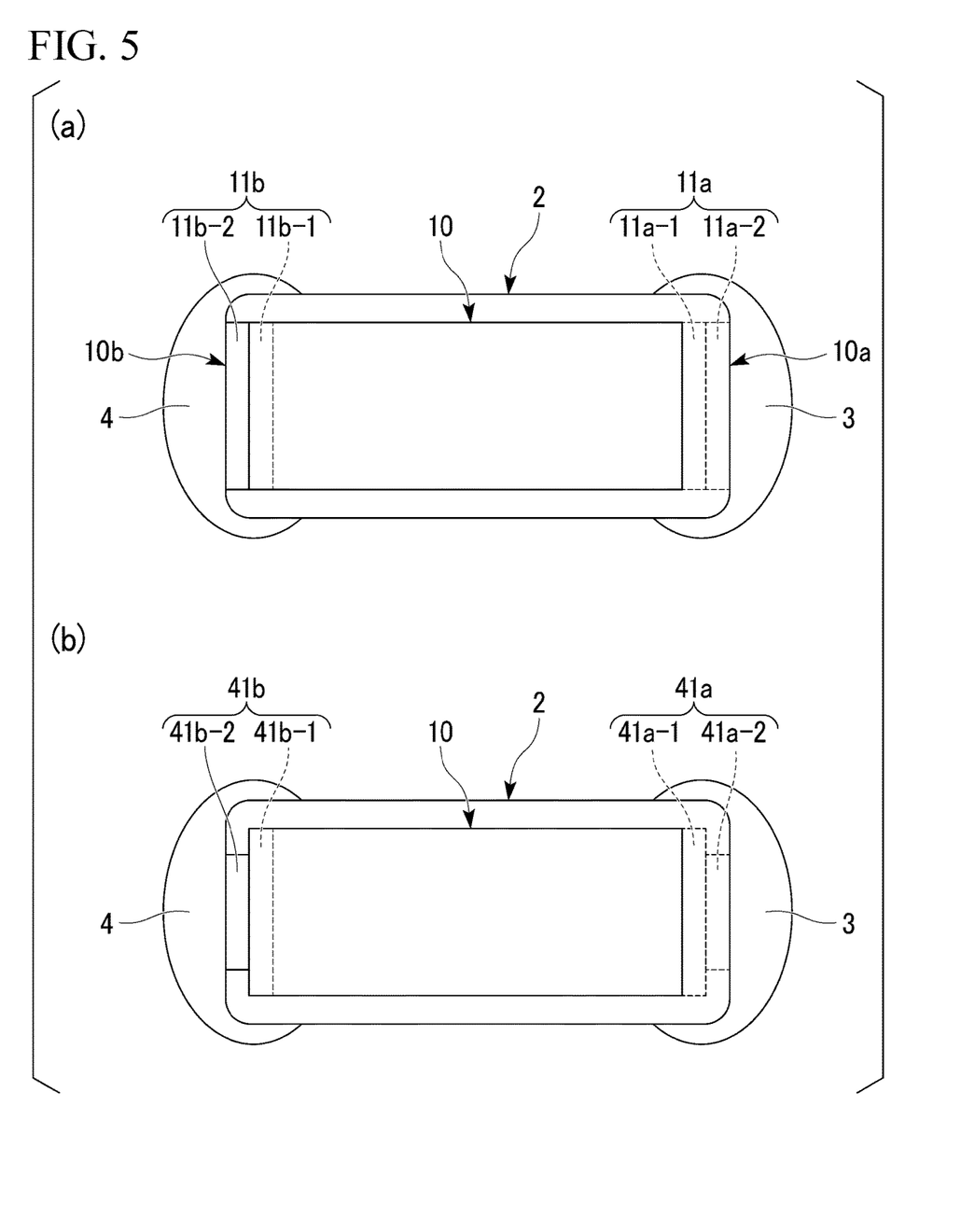
FIG. 5(a) is a plan view of the all-solid-state battery in FIG. 1
FIG. 5(b) is a plan view showing a modified example of FIG. 5(a).

FIG. 5(a) is a plan view of an all-solid-state battery in FIG. 1, and FIG. 5(b) is a modified example of FIG. 5(a).

In the all-solid-state battery 1 in FIG. 1, as shown in FIG. 5(a), the width of the extension part 11a-2 (the size in the direction orthogonal to the extension direction) is the same as the width of the main body part 11a-1 and the width of the extension part 11b-2 (the size in the direction orthogonal to the extension direction) is the same as the width of the main body part 11b-1, but the present disclosure is not limited thereto. As shown in FIG. 5(b), in a condition in which, in a current collector layer 41a, the electrical resistance between the extension part 11a-2 and the outer electrode 4 does not increase significantly, the width of an extension part 41a-2 may be smaller than the width of a main body part 41a-1. In addition, in a current collector layer 41b, the width of an extension part 41b-2 may be smaller than the width of a main body part 41b-1.

In addition, in the first current collector layer 31a of FIG. 3, the width of the first extension part 31a-2 may be smaller than the width of the first main body part 31a-1. In addition, in the second current collector layer 31b in FIG. 4, the width of the second extension part 31b-2 may be smaller than the width of the second main body part 31b-1.

While the embodiments of the present disclosure have been described above in detail, the present disclosure is not limited to the above embodiments, and various modifications and alternations can be made in a range within the spirit and scope of the present disclosure described in the scope of the claims.

For example, the first electrode layer 30a is positioned at the lower end of the laminated body 2 in the lamination direction (FIG. 3), but the present disclosure is not limited thereto, and the first electrode layer may be positioned at the upper end of the laminated body 2 in the lamination direction. In addition, the second electrode layer 30b is positioned at the upper end of the laminated body 2 in the lamination direction (FIG. 4), but the present disclosure is not limited thereto, and the second electrode layer may be positioned at the lower end of the laminated body 2 in the lamination direction.

In addition, one of the first electrode layer and the second electrode layer may form the positive electrode and the other of the first electrode layer and the second electrode layer may form the negative electrode.

In addition, the laminated body 2 may have a plurality of electrode layers 10a that function as the positive electrode, and may have a first electrode layer positioned at the lower end of the laminated body 2 in the lamination direction and a second electrode layer positioned at the upper end of the laminated body 2 in the lamination direction. Similarly, the laminated body 2 may have a plurality of electrode layers 10b that function as the negative electrode and may have a first electrode layer positioned at the lower end of the laminated body 2 in the lamination direction and a second electrode layer positioned at the upper end of the laminated body 2 in the lamination direction. In this manner, both the first electrode layer and the second electrode layer may form either a positive electrode or a negative electrode.

EXAMPLES

Hereinafter, examples of the present disclosure will be described. The present disclosure is not limited to the following examples.

Example 1

An all-solid-state battery element with a size of 3.2 mm×2.5 mm×1.0 mm was produced using copper for a positive electrode current collector layer, $Li_3V_2(PO_4)_3$ for a positive electrode active material layer, copper for a negative electrode current collector layer, $Li_3V_2(PO_4)_3$ for a negative electrode active material layer, and $Li_{1.3}Al_{0.3}Ti_{1.7}(PO_4)_3$ for a solid electrolyte layer according to the above production method. The positive electrode current collector layer and the negative electrode current collector layer were formed by a screen printing method. The electrode length of a main body part of the current collector layer was 2.8 mm and the electrode length of an extension part was 0.2 mm. An outer electrode was formed through a copper paste application process, a baking process, and a nickel and tin electroplating process in this order. In Example 1, an all-solid-state battery in which the thickness of the main body part of the current collector layer was 6 μm, and the ratio ($t_e/t_b$) of the thickness of the extension part to the thickness of the main body part of the current collector layer was 60% was produced.

Example 2

An all-solid-state battery was produced in the same manner as in Example 1 except that the ratio ($t_e/t_b$) was 50%.

Example 3

An all-solid-state battery was produced in the same manner as in Example 1 except that the ratio ($t_e/t_b$) was 40%.

Example 4

An all-solid-state battery was produced in the same manner as in Example 1 except that the ratio ($t_e/t_b$) was 30%.

Example 5

An all-solid-state battery was produced in the same manner as in Examples 1 to 4 except that the ratio ($t_e/t_b$) was 20%.

Comparative Example 1

An all-solid-state battery was produced in the same manner as in Examples 1 to 4 except that the ratio ($t_e/t_b$) was 100%.

Next, the all-solid-state batteries obtained in the above examples and comparative examples were measured and evaluated by the following methods.

[Measurement of Ratio ($t_e/t_b$) of Thickness of Extension Part to Thickness of Main Body Part of Current Collector Layer]

Using a scanning electron microscope (product name "S-4800" commercially available from Hitachi High-Technologies Corporation), in the cross section of the produced all-solid-state battery, respective parts of the current collector were observed, the thickness was measured, and the thickness ratio ($t_e/t_b$) of the current collector was measured. As a result, it was confirmed that the ratio ($t_e/t_b$) in examples and comparative examples was the value shown in Table 1.

[Measurement of Fault Rate Due to Plating Solution Penetration]

A charging and discharging testing machine (product name "ACD-01" commercially available from Aska Electronic Co., Ltd.) was used for charging, and an initial failure rate due to charge abnormality at that time was calculated. Then, in N=500, when the fault rate due to plating solution penetration was 1.0% or less, it was determined as favorable "A," when the fault rate was 1.0 or more and less than 2.0, it was determined as almost favorable "B," and when the fault rate was 2% or more, it was determined as poor "C." The results are shown in Table 1.

| | Ratio ($t_e/t_b$) of thickness of extension part to thickness of main body part | Fault rate due to plating solution penetration | Evaluation |
|---|---|---|---|
| Example 1 | 60% | 1.6% | Almost favorable |
| Example 2 | 50% | 1.0% | Favorable |
| Example 3 | 40% | 1.0% | Favorable |
| Example 4 | 30% | 0.8% | Favorable |
| Example 5 | 20% | 0.8% | Favorable |
| Comparative Example 1 | *100%* | 6.0% | Poor |

Note)
The italic and bold number indicates outside of the scope of the present disclosure Based on the results in Table 1, it was found that, in Example 1, when the ratio ($t_e/t_b$) of the thickness of the extension part to the thickness of the main body part of the current collector layer was 60%, the fault rate due to plating solution penetration was almost favorable at 1.6%, and it was possible to reduce the occurrence of failures due to plating solution penetration.

In Example 2, it was found that, when the ratio ($t_e/t_b$) was 50%, the fault rate due to plating solution penetration was favorable at 1.0%, and it was possible to further reduce the occurrence of faults due to plating solution penetration.

In Example 3, it was found that, when the ratio ($t_e/t_b$) was 40%, the fault rate due to plating solution penetration was favorable at 1.0%, and it was possible to further reduce the occurrence of faults due to plating solution penetration.

In Example 4, it was found that, when the ratio ($t_e/t_b$) was 30%, the fault rate due to plating solution penetration was favorable at 0.8%, and it was possible to further reduce the occurrence of faults due to plating solution penetration.

In Example 5, it was found that, when the ratio ($t_e/t_b$) was 20%, the fault rate due to plating solution penetration was favorable at 0.8%, and it was possible to further reduce the occurrence of faults due to plating solution penetration.

On the other hand, in Comparative Example 1, when the ratio ($t_e/t_b$) was 100%, the fault rate due to plating solution penetration was high at 6.0%, and it was not possible to sufficiently reduce the occurrence of faults due to plating solution penetration.

REFERENCE SIGNS LIST

1 All-solid-state battery
2 Laminated body
2a End surface
2b Lower corner
2c Upper corner
3 Outer electrode
4 Outer electrode
10 Electrode layer
10A Electrode layer group
10a Electrode layer
10B Electrode layer group
10b Electrode layer
11 Current collector layer
11a Current collector layer
11b Current collector layer
11a-1 Main body part
11a-2 Extension part
11b-1 Main body part
11b-2 Extension part
12 Active material layer
12a Active material layer 12b Active material layer
13a End surface
13b End surface
20 Solid electrolyte layer
30a First electrode layer
30b Second electrode layer
31a First current collector layer
31a-1 First main body part
31a-2 First extension part
31b Second current collector layer
31b-1 Second main body part
31b-2 Second extension part
32a First active material layer
32b Second active material layer
33a End surface
33b End surface
41a Current collector layer
41a-1 Main body part
41a-2 Extension part
41b Current collector layer
41b-1 Main body part
41b-2 Extension part
$t_b$ Thickness
$t_e$ Thickness

The invention claimed is:

1. An all-solid-state battery comprising a laminated body in which electrode layers in which a current collector layer and active material layers are laminated with solid electrolyte layers containing a solid electrolyte therebetween,
wherein the current collector layer is a single layer and includes a main body part formed inside the laminated body and an extension part that extends from an end surface of the main body part to an end surface of the laminated body,
wherein the thickness of the extension part on the end surface of the laminated body is smaller than the thickness of the main body part, and
wherein the thickness of the active material layers on the end surface of the laminated body is larger than the thickness of a region of the active material layers which overlaps the main body part.

2. The all-solid-state battery according to claim 1,
wherein the ratio of the thickness of the extension part to the thickness of the main body part is 20% or more and 50% or less.

3. The all-solid-state battery according to claim 2,
wherein the thickness of the extension part is 0.3 μm or more and 3 μm or less.

4. The all-solid-state battery according to claim 1,
wherein the ratio of the length of the extension part in the extension direction to the length of the main body part is 0.2% or more and 20% or less.

5. The all-solid-state battery according to claim 4,
wherein the length of the extension part in the extension direction is 10 μm or more and 1,000 μm or less.

6. The all-solid-state battery according to claim 1,
wherein the laminated body has a plurality of electrode layers, and a first electrode layer positioned at one end of the laminated body in the lamination direction includes a first current collector layer and a first active material layer,
wherein the first current collector layer is a single layer and includes a first main body part formed inside the laminated body and a first extension part that extends from an end surface of the first main body part to an end surface of the laminated body, and
wherein the first extension part is provided to be shifted from the center position of the first main body part in the thickness direction toward the central part of the laminated body with respect to the lamination direction of the laminated body.

7. The all-solid-state battery according to claim 6,
wherein a second electrode layer positioned at the other end of the laminated body in the lamination direction includes a second current collector layer and a second active material layer,
wherein the second current collector layer is a single layer and includes a second main body part formed inside the laminated body and a second extension part that extends from an end surface of the second main body part to an end surface of the laminated body, and
wherein the second extension part is provided to be shifted from the center position of the second main body part in the thickness direction toward the central part of the laminated body with respect to the lamination direction of the laminated body.

8. The all-solid-state battery according to claim 7,
wherein one of the first electrode layer and the second electrode layer constitutes a positive electrode, and the other of the first electrode layer and the second electrode layer constitutes a negative electrode.

9. The all-solid-state battery according to claim 7,
wherein both of the first electrode layer and the second electrode layer constitute either a positive electrode or a negative electrode.

10. The all-solid-state battery according to claim 1,
wherein the current collector layer contains only one extension part.

11. The all-solid-state battery according to claim 1,
wherein the main body part and the extension part of the current collector layer are made of the same material.

* * * * *